United States Patent [19]

Pearson

[11] Patent Number: 4,982,209

[45] Date of Patent: Jan. 1, 1991

[54] CAMERA APPARATUS FOR DETECTING CODE INDICIA

[75] Inventor: Robert B. Pearson, Rochester, N.Y.

[73] Assignee: Eastman Kodak Company, Rochester, N.Y.

[21] Appl. No.: 478,873

[22] Filed: Feb. 12, 1990

[51] Int. Cl.$^5$ ................................................ G03B 7/00
[52] U.S. Cl. ........................................ 354/21; 354/288
[58] Field of Search ............................... 354/21, 288 F

[56] References Cited

U.S. PATENT DOCUMENTS

| | | | |
|---|---|---|---|
| 4,431,283 | 2/1984 | Hoda et al. | 354/21 |
| 4,550,991 | 11/1985 | Ishizaka et al. | 354/21 |
| 4,558,935 | 12/1985 | Ishizaka et al. | 354/21 |
| 4,582,408 | 4/1986 | Miki et al. | 354/21 |
| 4,588,273 | 5/1986 | Nagata | 354/21 |
| 4,676,616 | 6/1987 | Hoda et al. | 354/21 |
| 4,714,332 | 12/1987 | Equchi et al. | 354/21 |
| 4,783,671 | 11/1988 | Haraguchi | 354/21 |

FOREIGN PATENT DOCUMENTS 3502541 1/1985 Fed. Rep. of Germany .

*Primary Examiner*—L. T. Hix
*Assistant Examiner*—David M. Gray
*Attorney, Agent, or Firm*—Roger A. Fields

[57] ABSTRACT

A camera apparatus for detecting code indicia in the form of a series of electrically conductive areas located on the exterior of a film cartridge, includes a loading chamber adapted to receive the cartridge and a plurality of metallic probes which protrude slightly into the chamber to make electrical contact with at least some of the conductive areas of the cartridge. According to the invention, an electrically insulative mounting block has respective securement means equal in actual number to a predetermined number of the conductive areas of the cartridge for permitting the probes to be manually secured selectively to the mounting block, whereby only a minimum number of the probes required for the camera apparatus which is less than the actual number of the securement means need be included in the assembly.

5 Claims, 2 Drawing Sheets

CAMERA APPARATUS FOR DETECTING CODE INDICIA

BACKGROUND OF THE INVENTION

1. Field of the Invention

The invention relates generally to the field of photographic cameras, and in particular to camera apparatus for detecting code indicia indicative of one or more film-related characteristics. More specifically the invention relates to camera apparatus for detecting code indicia located on the exterior of a film cartridge.

2. Description of the Prior Art (FIG. 1)

FIG. 1 depicts a KODAK DX 35 mm film cartridge 1. As is known, the cartridge 1 includes a series of six sensing patches or areas #1, #2, #3, #4, #5, and #6, located on the exterior of the metallic canister 3. Patch #1 is conductive for every available film speed since it is intended to serve as a common area or ground for sensing by a corresponding electrical probe in a camera designed for use with the cartridge 1. Patches #2, #3, #4, #5, and #6 are selectively conductive or non-conductive for sensing by respective electrical probes in the camera to provide binary encodements of respective film speeds as ISO speed values or the equivalent DIN speed values. An insulative paint 2 covers those patches to be non-conductive to thereby prevent them from being conductive.

According to the Kodak DX film speed coding scheme, patch #1 is a constant and patches #2–#6 have different weights which are multiplicative in terms of ISO speed values and are additive in terms of the equivalent DIN speed values. This is illustrated in Table 1 below.

TABLE 1

| System | #1 | #2 | #3 | #4 | #5 | #6 |
|---|---|---|---|---|---|---|
| ISO | 20 | ×2 | ×4 | ×16 | ×2$^{\frac{1}{3}}$ | ×2$^{\frac{2}{3}}$ |
| DIN | 14 | +3 | +6 | +12 | +1 | +2 |

Each available cartridge 1 lists the film speed on the exterior of the metal cannister 3 as an ISO speed value and the equivalent DIN speed value for the filmstrip contained in the cannister. For, ISO 80, for example, patches #2, #5, and #6 in addition to patch #1 are conductive. Thus, ISO 80 would be calculated as follows:

$$20(\text{constant}) \times 2(\#2) \times 2_{1/3}(\#5) \times 2_{2/3}(\#6) = 80$$

The equivalent DIN $20_0$ would be calculated as follows:

$$14(\text{constant}) + 3(\#2) + 1(\#5) + 2(\#6) = 20$$

Known apparatus 11 is shown in FIG. 1 for detecting whether anyone of patches #2, #3, and #4 in addition to patch #1 is conductive. Other apparatus (not shown), which is more elaborate, may be used to detect whether anyone of patches #2, #3, #4, #5, and #6 in addition to patch #1 is conductive. Briefly, the apparatus 11 comprises a wall member 13 shaped to define a cylindrical loading chamber 15 for receiving the cartridge 1. Four metallic probes illustrated as spring-like members 17 are insert molded into a plastic base 19. The plastic base 19 is secured permanently to an outside portion of the wall member 13 by means of two studs 21 that are embedded in respective holes 23 in the plastic base. A separate plastic insert 25 is snugly fitted within a rectangular opening 27 in the wall member 13 to be located opposite patches #1–#4 when the cartridge 1 is received in the loading chamber 15. Each of the spring-like members 17 includes a pair of u-shaped tips 29, the bases of which extend through resPective holes 31 in the plastic insert 25 to make electrical contact with patches #1–#4. Since the spring-like members 17 are insert molded into the Plastic base 19, each one of them must be included in a camera regardless of whether it is required for code sensing in the camera. For example, it could be that only three of the spring-like members 19 are required for code sensing. Thus, an unnecessary cost results.

Other examples of the prior art are shown in U.S. Pat. Nos. 4,173,401; 4,431,283; 4,550,991; 4,558,935; 4,582,408; 4,714,332; 4,588,273; 4,676,616; and 4,783,671.

SUMMARY OF THE INVENTION

According to the invention, there is provided an improved camera apparatus for detecting code indicia in the form of a series of electrically conductive areas located on the exterior of a film cartridge, wherein a loading chamber is adapted to receive the cartridge and a plurality of metallic probes protrude slightlY into the chamber to make electrical contact with at least some of the conductive areas of the cartridge, and wherein the improvement comprises:

an electrically insulative mounting block having respective securement means equal in actual number to a predetermined number of the conductive areas of the cartridge for permitting the probes to be manually secured selectively to the mounting block, whereby only a minimum number of the probes required for the camera apparatus which is less than the actual number of the securement means need be included.

DETAILED DESCRIPTION OF THE PREFERRED EMBODIMENT

The invention is disclosed as being embodied preferably in a 35 mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

The Film Cartridge

Figure 1:
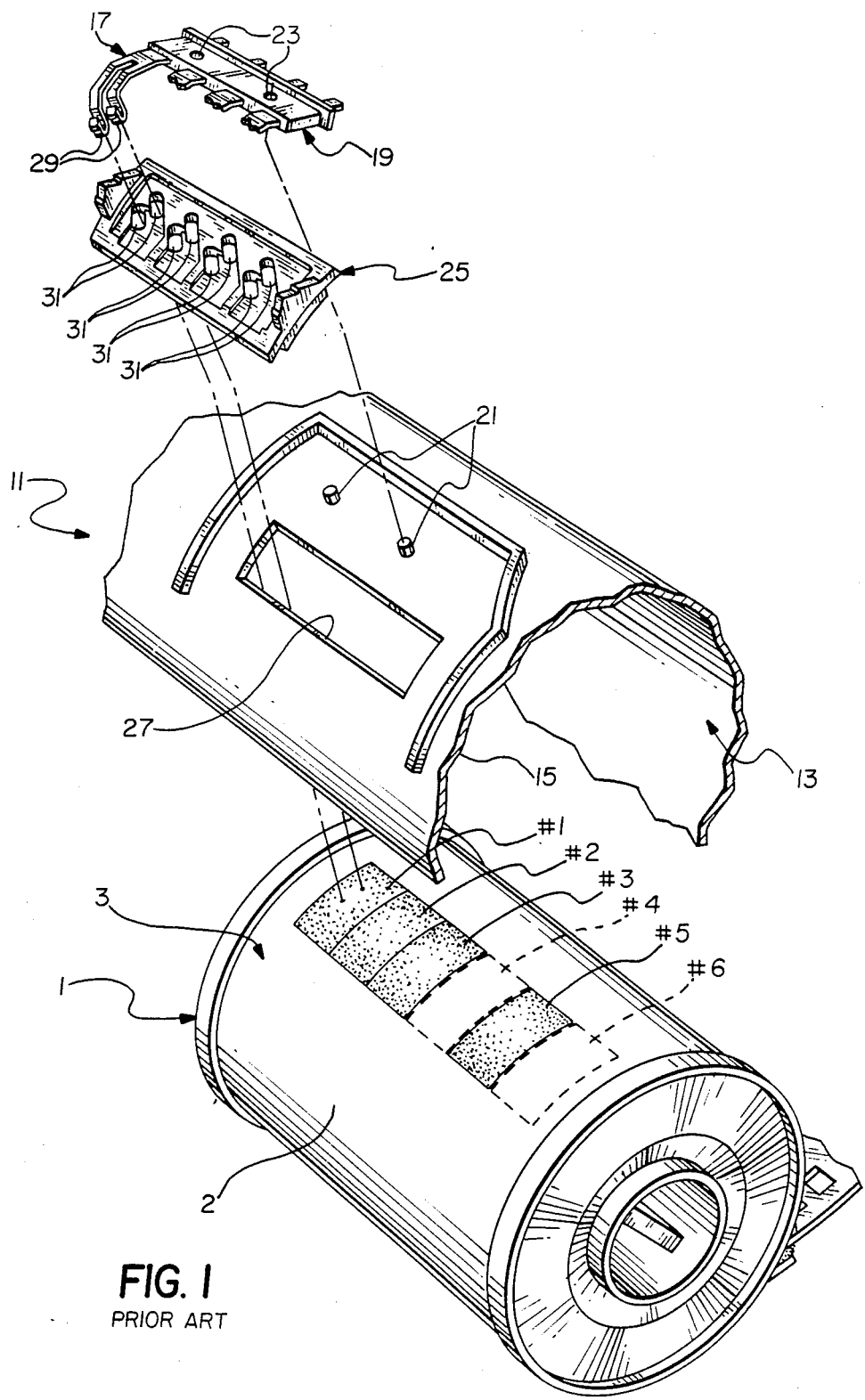
FIG. 1 is an exploded perspective view of a prior art version of camera apparatus for detecting code indicia.
Figure 2:
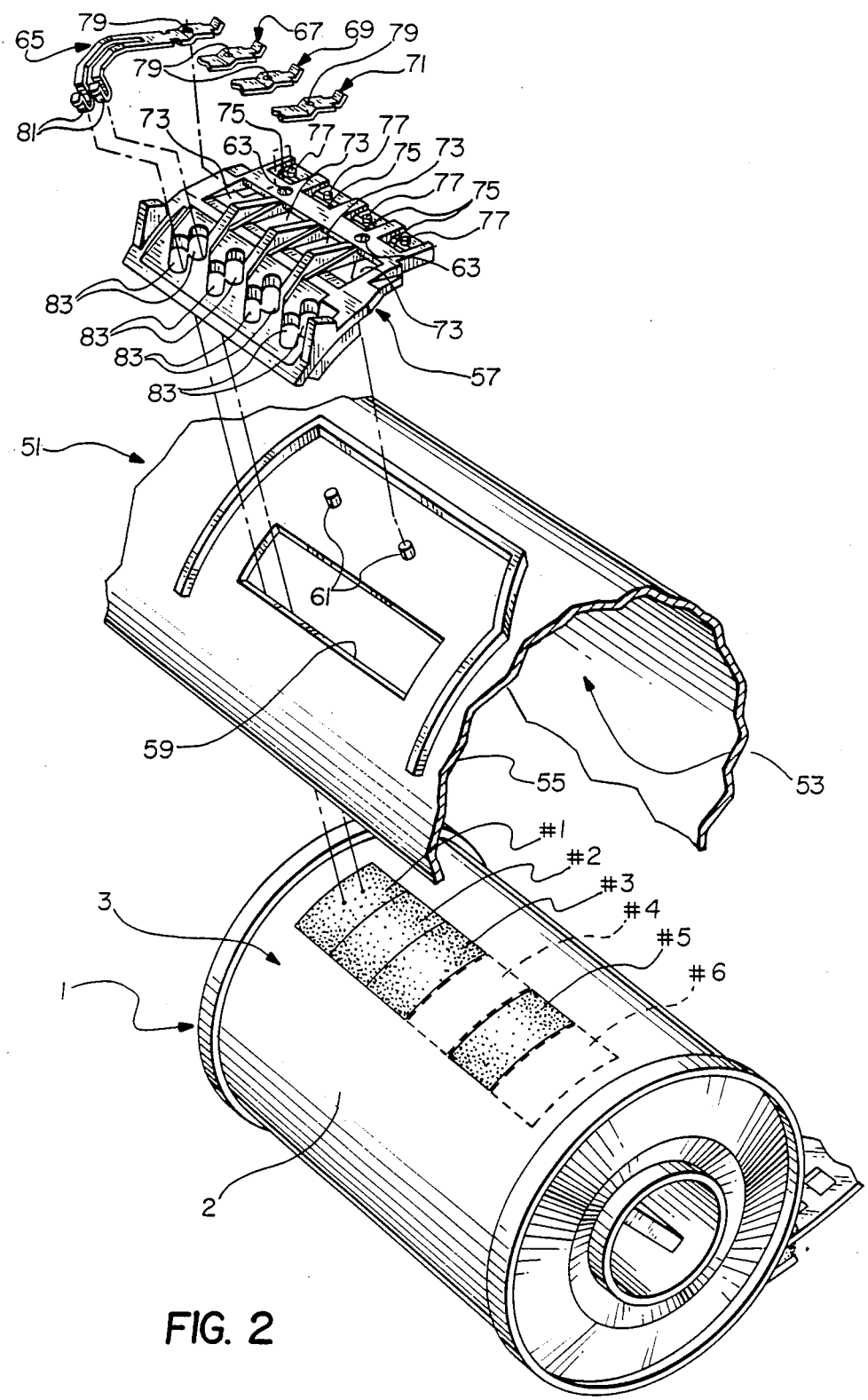
FIG. 2 an exploded perspective view of an improved version of camera apparatus for detecting code indicia, according to a preferred embodiment of the invention.

Referring now to the drawings, FIG. 2 depicts a prior art KODAK DX 35 mm film cartridge 1 that is the same as the one depicted in FIG. 1. As is known, the cartridge 1 includes a series of six patches or areas #1, #2, #3, #4, #5, and #6, located on the exterior of the metallic canister 3. Patch #1 is conductive for every available film speed since it is intended to serve as a common area or ground for sensing by a corresponding electrical probe in a camera designed for use with the cartridge 1. Patches #2, #3, #4, #5, and #6 are selectively conductive or non-conductive for sensing by respective electrical probes in the camera to provide binary encodements of respective film speeds as ISO speed values or the equivalent DIN speed values. An insulative paint 2 covers those patches to be non-conductive to thereby prevent them from being conductive.

According to the Kodak DX film speed coding scheme, patch #1 is a constant and patches #2–#6 have different weights which are multiplicative in terms of ISO speed values and are additive in terms of the equivalent DIN speed values. This is illustrated in Table 1 below.

TABLE 1

| System | #1 | #2 | #3 | #4 | #5 | #6 |
|--------|----|----|----|----|----|----|
| ISO    | 20 | ×2 | ×4 | ×16 | ×2⅓ | ×2⅔ |
| DIN    | 14 | +3 | +6 | +12 | +1 | +2 |

Each available cartridge 1 lists the film speed on the exterior of the metal cannister 3 as an ISO speed value and the equivalent DIN speed value for the filmstrip contained in the cannister. For, ISO 80, for example, patches #2, #5, and #6 in addition to patch #1 are conductive. Thus, ISO 80 would be calculated as follows:

$$20(\text{constant}) \times 2(\#2) \times 2_{1/3}(\#5) \times 2_{2/3}(\#6) = 80$$

The equivalent DIN $20_0$ would be calculated as follows:

$$14(\text{constant}) + 3(\#2) + 1(\#5) + 2(\#6) = 20$$

Tha Camera Apparatus

According to the invention, camera apparatus 51 is provided for detecting whether anyone of patches #2 and/or #3, and/or #4 in addition to patch #1 is conductive. Other apparatus (not shown), which is more elaborate, may be used to detect whether anyone of patches #2, #3, #4, #5, and #6 in addition to patch #1 is conductive. However, the inventive concepts would remain the same as in the first instance.

The camera apparatus 51 comprises a known wall member 53 shaped to define a cylindrical loading chamber 55 for receiving the cartridge 1. A plastic mounting block 57 is snug fitted within a rectangular opening 59 in the wall member 53 to be located opposite patches #1–#4 when the cartridge 1 is received in the loading chamber 55. The mounting block 57 is secured permanently to an outside portion of the wall member 53 by means of two studs 61 that are embedded in respective holes 63 in the mounting block.

A plurality of metallic probes illustrated as spring-like members 65, 67, 69, and 71 can be used to make respective electrical contact with patches #1–#4. See FIG. 2. The mounting block 57 has securement means preferably embodied as four pairs of aligned slide-through holes 73 and 75 for receiving respective ones of the spring-like members 65, 67, 69, and 71 and four corresponding mounting studs 77 adapted to be inserted in respective mounting holes 79 in the spring-like members. This arrangement permits the spring-like members 65, 67, 69, and 71 to be manually secured selectively, one at a time, to the mounting block 57. In practice, the spring-like member 65 would always be manually secured to the mounting block 57 since that member is intended to detect patch #1, the ground or common. However, one or more of the spring-like members 67, 69, and 71 would be manually secured to the mounting block 57, depending on the number of those members that is required to suit operation of the particular camera in which the camera apparatus 51 is to be used. Thus, only a minimum number of the spring-like members 65, 67, 69, and 71 which is less than the actual number of the securement means 73, 75, 77, 79 need be included in the camera apparatus 51. This represents a significant cost-saving as compared to the prior art apparatus 11 depicted in FIG. 1, where all four of the spring-like members 17 must always be included (even though all of them are not required).

Each of the spring-like members 65, 67, 69, and 71 has a pair of u-shaped tips 81, the bases of which extend through respective holes 83 in the mounting base 53 to make electrical contact with patches #1–#4.

The invention has been described with reference to a preferred embodiment. However, it will be understood that various modifications can be effected within the ordinary skill in the art without departing from the scope of the invention.

I claim:

1. An improved camera apparatus for detecting code indicia in the form of a series of electrically conductive areas located on the exterior of a film cartridge, wherein (a) a loading chamber is adapted to receive the cartridge and (b) a plurality of metallic probes protrude slightly into said chamber to make electrical contact with at least some of the conductive areas of the cartridge, and wherein the improvement comprises:

an electrically insulative mounting block having respective securement means equal in actual number to a predetermined number of conductive areas of the cartridge for permitting said probes to be manually secured selectively to said mounting block to enable only a minimum number of the probes required for said camera apparatus which is less than the actual number of said securement means to be used; and respective mounting holes provided on one of said mounting block or probes and respective mounting studs provided on the other of the mounting block and probes mutually engageable to manually affix said probes to said mounting block.

2. The improvement as recited in claim 1, wherein said probes are elongate spring-like members, and each of said securement means of said mounting block has respective pairs of slide-through holes in the mounting block for slidably receiving one of said spring-like members to manually secure the spring-like members selectively to the mounting block.

3. The improvement as recited in claim 2, wherein said spring-like members include said mounting holes, and said mounting block includes said mounting studs to manually affix the spring-like members to the mounting block.

4. The improvement as recited in claim 3, wherein said mounting studs of said mounting block are aligned with the respective pairs of said slide-through holes in the mounting block.

5. The improvement as recited in claim 3, wherein said mounting block has through-holes to said loading chamber, and said spring-like members include respective tips which extend through said through holes for making electrical contact with the conductive areas of the cartridge.

* * * * *